United States Patent [19]

Koike et al.

[11] 4,011,402

[45] Mar. 8, 1977

[54] SCANNING CIRCUIT TO DELIVER TRAIN OF PULSES SHIFTED BY A CONSTANT DELAY ONE AFTER ANOTHER

[75] Inventors: Norio Koike, Musashino; Takamitsu Kamiyama, Kodaira; Mikio Ashikawa, Koganei, all of Japan

[73] Assignee: Hitachi, Ltd., Japan

[22] Filed: Aug. 19, 1974

[21] Appl. No.: 498,656

[30] Foreign Application Priority Data

Aug. 24, 1973 Japan .............................. 48-94438

[52] U.S. Cl. .............................. 358/213; 178/7.6; 307/208; 307/251

[51] Int. Cl.² ................... H04N 3/14; H03K 17/56; H03K 17/60

[58] Field of Search ................ 178/7.1, 7.3 D, 7.6; 357/30, 41, 42, 45; 250/211 J, 578; 340/173 LT, 173 LS, 173 SR; 328/38, 55; 333/29; 307/205, 208, 214, 221 C, 242, 251, 269, 279, 304, 241; 315/169 TV

[56] References Cited

UNITED STATES PATENTS

| | | | |
|---|---|---|---|
| 3,581,097 | 5/1971 | Hibi et al. | 178/7.1 |
| 3,622,809 | 11/1971 | Williams | 307/293 |
| 3,643,106 | 2/1972 | Berwin et al. | 340/173 SR |
| 3,676,590 | 7/1972 | Weimer | 178/7.1 |
| 3,676,711 | 7/1972 | Ahrons | 307/221 C |
| 3,715,485 | 2/1973 | Weimer | 178/7.1 |
| 3,731,161 | 5/1973 | Yamamoto | 357/41 |

OTHER PUBLICATIONS

Millman et al., Pulse, Digital and Switching Waveforms, McGraw Hill, New York, 1965, p. 669.
Kiver, Transistors, McGraw-Hill, 1959, pp. 297-303.
Lee, "FET Delay Circuit . . .", IBM Technical Disclosure Bulletin, vol. 14, No. 4, Sept. 1971, pp. 1082-1083.

Primary Examiner—John C. Martin
Attorney, Agent, or Firm—Craig & Antonelli

[57] ABSTRACT

In a scanning circuit having a plurality of cascade-connected unit circuits driven only by direct current, each unit circuit consisting of at least a pair of polarity inverting circuits, a train of output pulses shifted by a constant delay one after another depending upon the delay time proper to the unit circuits, are derived from the unit circuits by applying an input pulse to the first stage of the scanning circuit.

5 Claims, 8 Drawing Figures

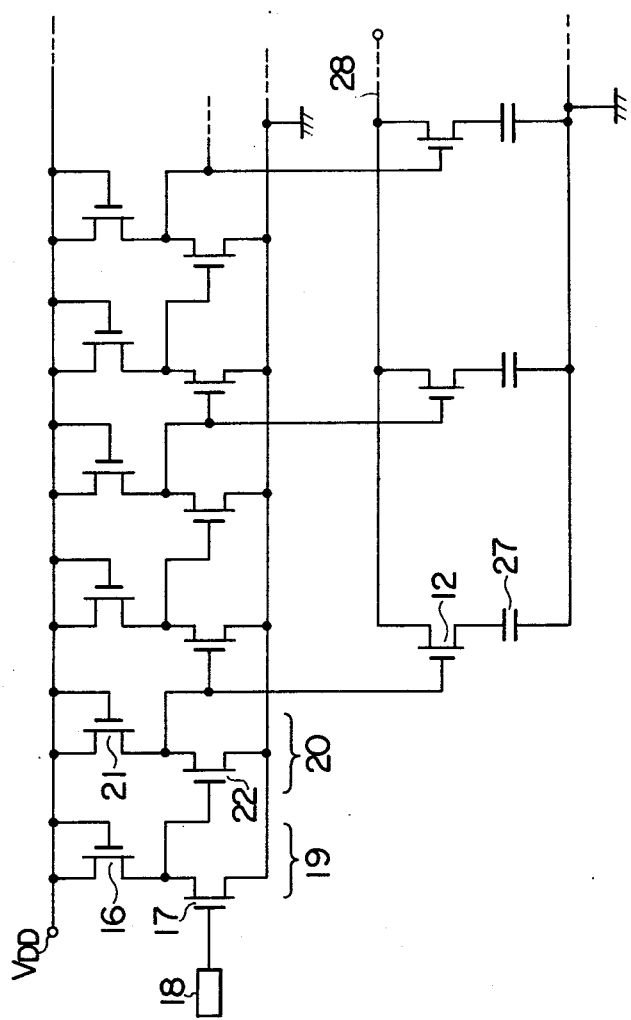

SCANNING CIRCUIT TO DELIVER TRAIN OF PULSES SHIFTED BY A CONSTANT DELAY ONE AFTER ANOTHER

BACKGROUND OF THE INVENTION

1. Field of the Invention

The present invention relates to an improvement on a scanning circuit used in a solid-state image pickup device etc.

2. Description of the Prior Art

Usually, a solid-stage image pickup device includes a scanning circuit comprising a multiplicity of photoelectric conversion elements such as PN junction photodiodes arranged in a linear or two-dimensional pattern, switching elements such as MOS field effect transistors (hereafter referred to as MOSFET) to take the outputs out of the photoelectric conversion elements onto an output line selectively, and a shift register to generate pulses to actuate the switching elements in time sequence. In a preferable case, the elements and the circuits constituting the solid-state image pickup device are formed in the surface of a single crystal silicon substrate through integrated circuit techniques. As an integrated circuit of the scanning circuit for the image pickup device is known a device in which a multiplicity of unit circuits, each consisting of four MOSFET's, are connected in cascade one after another so that by applying two clock signals having different phases to each unit circuit a train of pulses shifted by a delay time proper to the clock signals may be derived from the unit circuit sequentially. Such a means has several merits. Namely, it is small and light and its power consumption is small while its reliability is very high.

In the conventional scanning circuit, however, the conductance $g_m$ of the used MOSFET imposes a restriction upon the available frequencies of the clock signal: if the frequency or pulse repetition rate is too high, the circuit cannot operate properly so that the input pulses cannot be shifted. The conventional scanning circuit has, therefore, a drawback that the upper limit of the operating frequency is at most 4 to 5 MHz.

It is fundamentally possible to heighten the upper limit of the operating frequency by increasing the conductance $g_m$ of each MOSFET, but in such a case the area occupied by the MOSFET becomes larger so that the high density integration of the circuit is impossible.

Moreover, since clock pulses are used in this scanning circuit, noise produced as a result of the differentiation of the pulses through parasitic capacitances etc. is mixed to the output signal to degrade the S/N ratio.

SUMMARY OF THE INVENTION

One object of the present invention is to provide a scanning circuit which can produce a train of pulses having a high pulse frequency and which can be formed in a high density integrated circuit.

Another object of the present invention is to provide a scanning circuit in which the S/N ratio is very much improved.

The fundamental idea of the present invention is based on the fact that although input pulses applied to a scanning circuit must have a constant timing, the relevant output pulse train need not necessarily have a constant timing. This meaning is eqivalent to the fact that the linearity of the saw-tooth wave which, synchronized with, for example, the horizontal sync signal, is used for the scanning of the electron beam in an image pickup tube is not kept in an ideal condition. That is, the small distortion in the linearity of the saw-tooth wave is comparable to that in the timing of the output pulse train from the solid-state scanning circuit. Accordingly, it has proved that the application of clock pulses to the scanning circuit, which was considered essential, is not necessarily indispensable.

According to the present invention, therefore, there is provided a scanning circuit including a plurality of cascade-connected unit circuits driven only by direct current, each unit circuit consisting of at least a pair of polarity inverting circuits, wherein a train of output pulses shifted by a constant delay one after another depending upon the delay time proper to the unit circuits are derived from the unit circuits by applying an input pulse to the first stage of the unit circuits.

BRIEF DESCRIPTION OF THE DRAWING

FIG. 8 shows a scanning circuit according to the present invention, as applied to a memory circuit.

DESCRIPTION OF THE PREFERRED EMBODIMENTS

Figure 1:
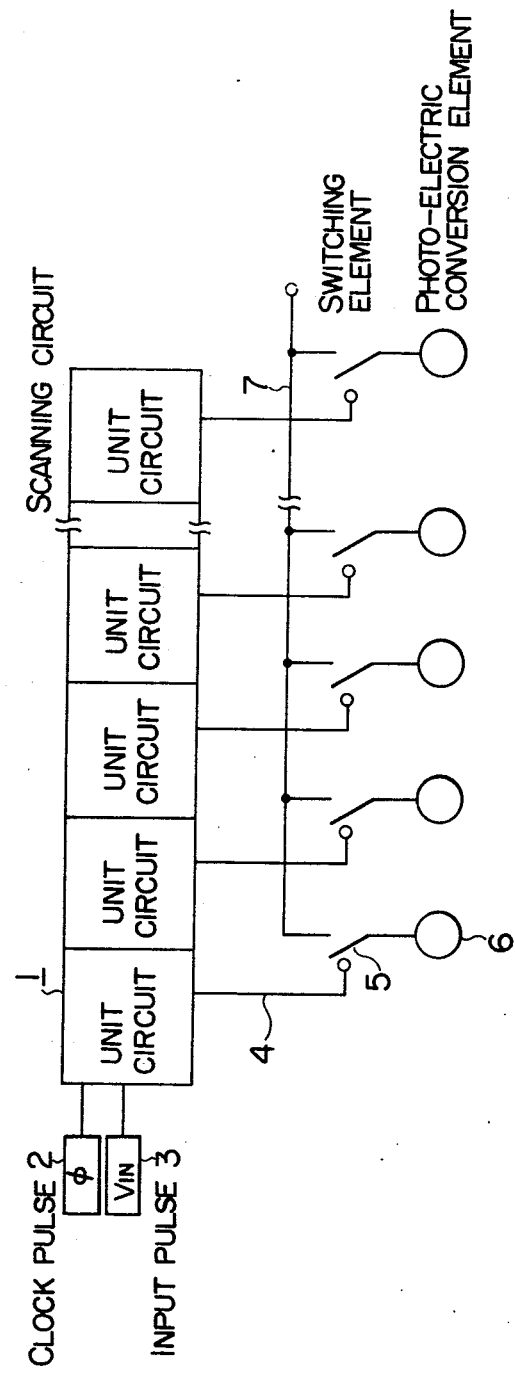
FIG. 1 schematically shows a fundamental structure of a solid-state image pickup device.

FIG. 1 shows a schematic structure of a linear solid-state image pickup device. In FIG. 1, two to four clock signals 2 having different phases and an input pulse signal 3 are applied to a scanning circuit 1 having a structure and a function of a shift register. When the clock signals 2 together with the input signal 3 are applied to the first stage of the shift register, an output pulse train made up of the input pulses shifted in time by the pulse interval proper to the clock signals is delivered sequentially at the output lines 4 of the respective stages of the shift register. A series of switching elements 5 are time-sequentially actuated by the pulse train and the signals from a series of photoelectric conversion elements 6 are taken out onto an output line 7. Since the signals from the photoelectric conversion elements 6 correspond to the optical image projected upon them, the video signal can be obtained through the operation described above.

Figure 2:
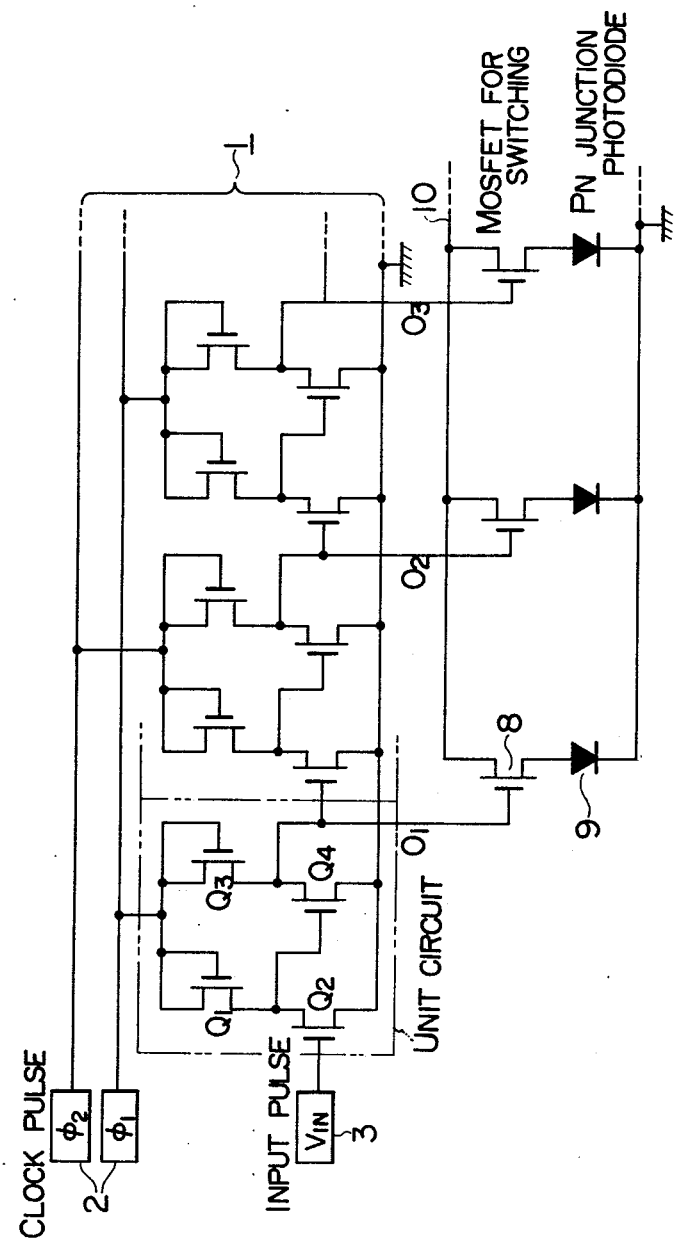
FIG. 2 shows the structure of a solid-state image pickup device using a conventional scanning circuit.
Figure 3:
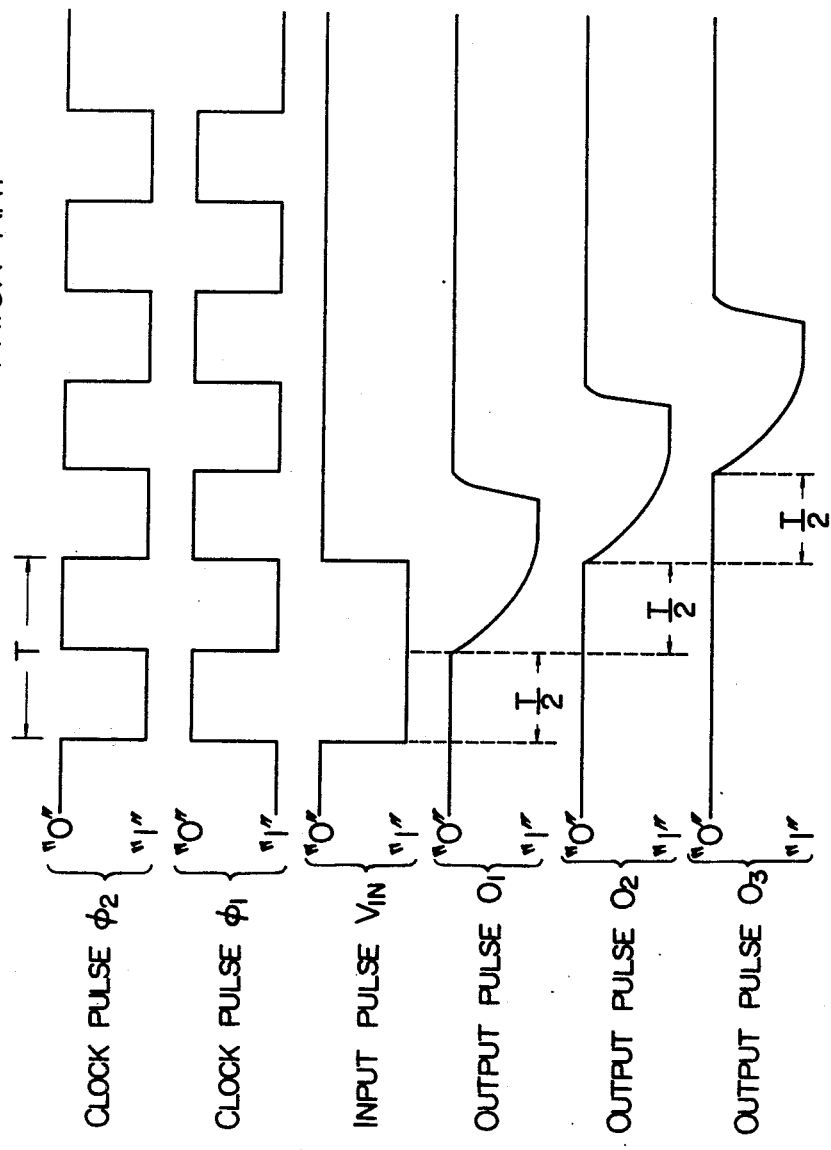
FIG. 3 is a timing chart for explaining the operation of the scanning circuit shown in FIG. 2.

In order to attain a high resolution with a solid-state image pickup device of the above mentioned type, it is required to employ 500 photoelectric conversion elements, 500 switching elements and 500 unit circuits for scanning. The solid-state image pickup device is, therefore, fabricated through MOS-LSI techniques which facilitate the high density integration of circuits. An exemplary circuit is shown in FIG. 2. In FIG. 2, a scanning circuit 1 has a multiplicity of cascade-connected unit circuits, each unit circuit being formed of four MOSFET's $Q_1$–$Q_4$; the gates of a series of switching MOSFET's 8 are connected with the unit circuits, respectively; and a series of PN junction photodiodes 9 are connected respectively with the sources of the switching MOSFET's 8. In the scanning circuit 1, input pulses $V_{IN}$ are shifted in response to two externally applied clock signals $\phi_1$ and $\phi_2$ having different phases, to deliver output pulses $O_1, O_2, O_3 \ldots$ which are shifted from one another by one half of the repetition time of the clock signal (equal to a half of the clock period T), as seen in FIG. 3. It should be noted that only P-channel MOSFET's are mentioned in the description of the invention and that the negative logic is used. By actuating the switching MOSFET's 8 by the output pulses, the signals from the photodiodes 9 are fed to an output line 10 connected with the drain of the switching MOSFET's 8.

The solid-state image pickup device having the structure described above is smaller, lighter and more reliable and consumes less power than a conventional image pickup tube. Therefore, the solid-state device has several advantages over the conventional tubes.

On the other hand, however, the operation of the scanning circuit of shift register type shown in FIG. 2 is restricted by the conductances $g_m$ of the MOSFET's constituting the circuits so that the circuit becomes inoperative, that is, the input pulses cannot be shifted, for clock signals having too high frequencies. Accordingly, the upper limit of the operating frequency of the scanning circuit in current use is at most 4–5 MHz. If the conductance $g_m$ of each MOSFET is increased to heighten the upper limit, the area occupied by the MOSFET increases to make difficult the high density integration of circuit. The shift register type scanning circuit needs clock pulses to shift the input pulses at a certain constant timing and therefore has an inevitable drawback that the clock pulses essential for the circuit operation are differentiated through parasitic capacitances and appear as noise on the signal output line to degrade the S/N ratio. Of course, the output pulses give rise to noise, but a single output pulse is delivered only from a single unit circuit while one clock signal is applied simultaneously to at least two unit circuits. Therefore, the output pulses contribute by far less to the noise than the clock pulses.

Figure 4:
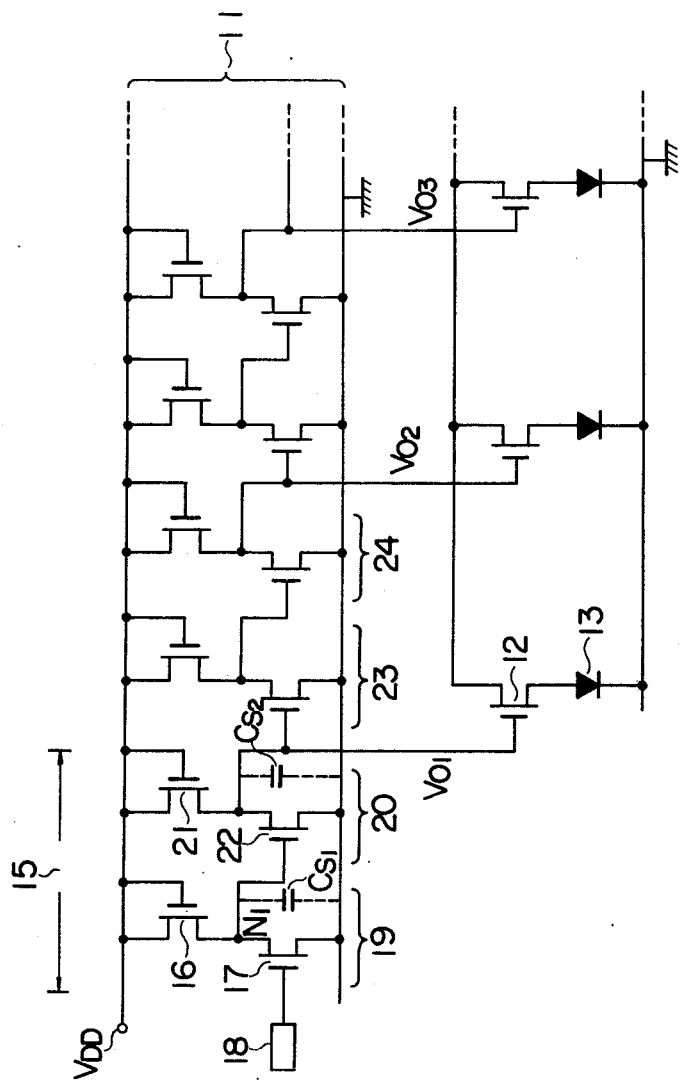
FIG. 4 shows the structure of a solid-state image pickup device using a scanning circuit as one embodiment of the present invention.

FIG. 4 shows a circuit configuration of a linear solid-state image pickup device using a scanning circuit as one embodiment of the present invention. In FIG. 4 are shown a scanning circuit 11 according to the present invention, switching MOSFET's 12, and PN junction photodiodes 13. The scanning circuit 11 consists of a multiplicity of unit circuits 15 connected in cascade one after another, each unit circuit being made up of two polarity inverting circuits 19 and 20 connected in cascade. The polarity inverting circuit 19 is constituted of a load MOSFET 16 and a driving MOSFET 17 and the drain and the gate of the load MOSFET 16 are commonly connected with a DC source $V_{DD}$. The drain of the driving MOSFET 17 is connected with the source of the load MOSFET 16 while the source of the driving MOSFET 17 is grounded.

The polarity inverting circuit 20 is formed of a load MOSFET 21 and a driving MOSFET 22. The drain and the gate of the load MOSFET 21 are commonly connected with the DC source $V_{DD}$ and the source of the load MOSFET 21 is connected with the drain of the driving MOSFET 22 while the source of the driving MOSFET is grounded. And the junction point of the source of the load MOSFET 16 and the drain of the driving MOSFET 17, of the polarity inverting circuit 19 is connected with the gate of the driving MOSFET 22 of the polarity inverting circuit 20.

An input pulse signal 18 is applied to the gate of the driving MOSFET 17 of the unit circuit 15 as the first stage of the scanning circuit 11 and the output from the junction point of the source of the load MOSFET 21 and the drain of the driving MOSFET 22, of the first stage unit circuit 15 is applied not only to the gate of the switching MOSFET 12 as an output pulse $O_1$ but also to the next stage unit circuit consisting of polarity inverting circuits 23 and 24 as an input. Parasitic capacitances are labeled $C_{S1}$ and $C_{S2}$.

The following description will be concerned with the case where all the used MOSFET's are of P-channel type and the negative logic plays a principal role, but the same description will hold for the N-channel MOSFET's if the polarity of voltage is restated oppositely.

Figure 5:
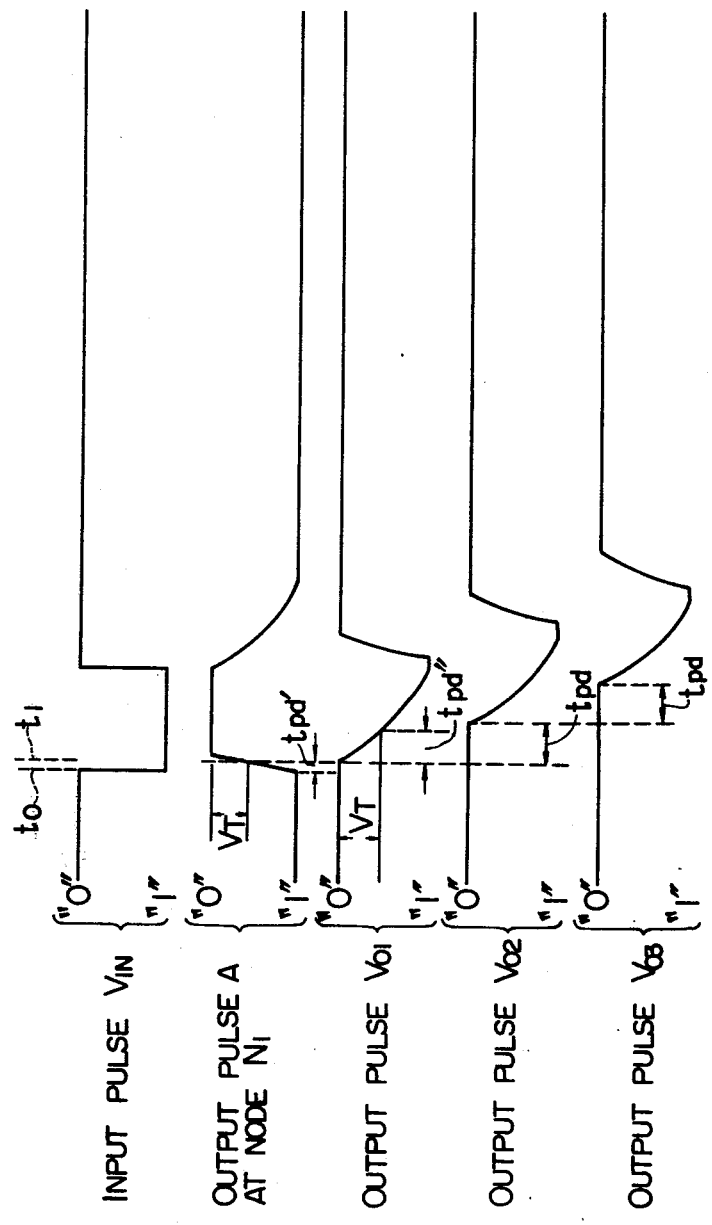
FIG. 5 is a timing chart for explaining the operation of the scanning circuit shown in FIG. 4.

As seen in the timing chart in FIG. 5, when a negative input pulse 18 having level 1 is applied to the gate of the driving MOSFET 17 of the polarity inverting circuit 19 in the first stage unit circuit 15 at an epoch $t_0$, an output A having level 0 which is the inversion of the input pulse 18 is delivered at the output terminal (i.e. node $N_1$ in FIG. 4) of the polarity inverting circuit 19. The falling time $t_f$ (the falling is defined as the transience of the level from 1 to 0) of the waveform of the output A is determined depending upon the time constant associated with the discharge through the driving MOSFET 17 of the electric charges stored up to then in the parasitic capacitance $C_{S1}$ which is the sum of the junction capacitance between the drain of the driving MOSFET 17 and the source of the load MOSFET 16, of the polarity inverting circuit 19 and the gate capacitance of the driving MOSFET 22 of the polarity inverting circuit 20 connected directly with the polarity inverting circuit 19. The rising time $t_r$ (the rising is defined as the transience of the level from 0 to 1) is determined by the time constant associated with the charging of the parasitic capacitance $C_{S1}$ through the load MOSFET 16. If the resistance of the load MOSFET 16 in the conductive state is $R_{ON1}$ and the conductance of the load MOSFET 16 is $g_{m}l$, the rising time $t_r$ is given by the expression:

$$t_r = 18 \cdot R_{ON1} \cdot C_{S1} = 18 \cdot \frac{1}{g_m l} \cdot C_{S1}.$$

In an ordinary polarity inverting circuit, the conductance of the load MOSFET is so designed as to be 1/15–1/20 of that of the driving MOSFET and therefore the falling time of the output pulse A at the node $N_1$ is 15–20 times as short as the rising time of the same pulse.

The output pulse A is then applied to the gate of the driving MOSFET 22 of the next polarity inverting circuit 20. The driving MOSFET 22 is cut off only when the amplitude of the output pulse A becomes lower than the threshold voltage $V_T$. If the epoch at which the amplitude of the output pulse A becomes equal to $V_T$ is $t_1$, the output parasitic capacitance $C_{S2}$ begins to be charged through the load MOSFET 21 from the epoch $t_1$ forward. When the amplitude of the output pulse A exceeds the threshold voltage $V_T$, the driving MOSFET 22 is turned conductive so that the charges stored in the parasitic capacitance $C_{S2}$ are released to deliver a pulse having level 1 and a width corresponding to that of the input pulse as the output of the unit circuit 15. The charging pulse having a slow rising time is an output pulse $V_{01}$ to actuate the first switching MOSFET 12. The delay $t_{pd'}$ ($= t_1 - t_0$) of the output pulse $V_{01}$ with respect to the input pulse is very small because the falling of the output pulse is steep.

Next, the output pulse $V_{01}$ is applied to the polarity inverting circuit 23 of the next stage unit circuit. If the time required for the voltage of the pulse $V_{01}$ to rise up to the threshold voltage is $t_{pd''}$, the output of the polarity inverting circuit 23 rapidly falls down to the level 0 after the time $t_{pd''}$ and when the output pulse $V_{01}$ return to the level 0, the output of the polarity inverting circuit 23 slowly rises up to the level 1 again. When the output is applied to the next polarity inverting circuit 24, an output pulse $V_{02}$ having a delay time of $t_{pd}$ ($= t_{pd'} + t_{pd''}$) with respect to the output pulse $V_{01}$ is produced. The output pulse $V_{02}$ is applied as an input to the unit circuit as the next stage and an output pulse $V_{03}$ having a delay time $t_{pd}$ etc. will be successively produced in the same manner as described above.

As described above, the output pulse $V_{01}$ has little delay time $t_{pd'}$ with respect to the input pulse but the output pulse $V_{02}$ or $V_{03}$ has a delay time $t_{pd}$ with respect to the just preceding output pulse. Therefore, except the first output pulse, a train of output pulses each of which has a delay time $t_{pd}$ with respect to the immediately preceding pulse are successively applied to the switching MOSFET's 12.

As apparent from the above description, the delay time $t_{pd}$ is uniquely determined by the conductance $g_m$ of the load MOSFET and the parasitic capacitances $C_{S1}$ and $C_{S2}$ (especially $C_{S2}$ of the output section) of the unit circuit.

Figure 6:
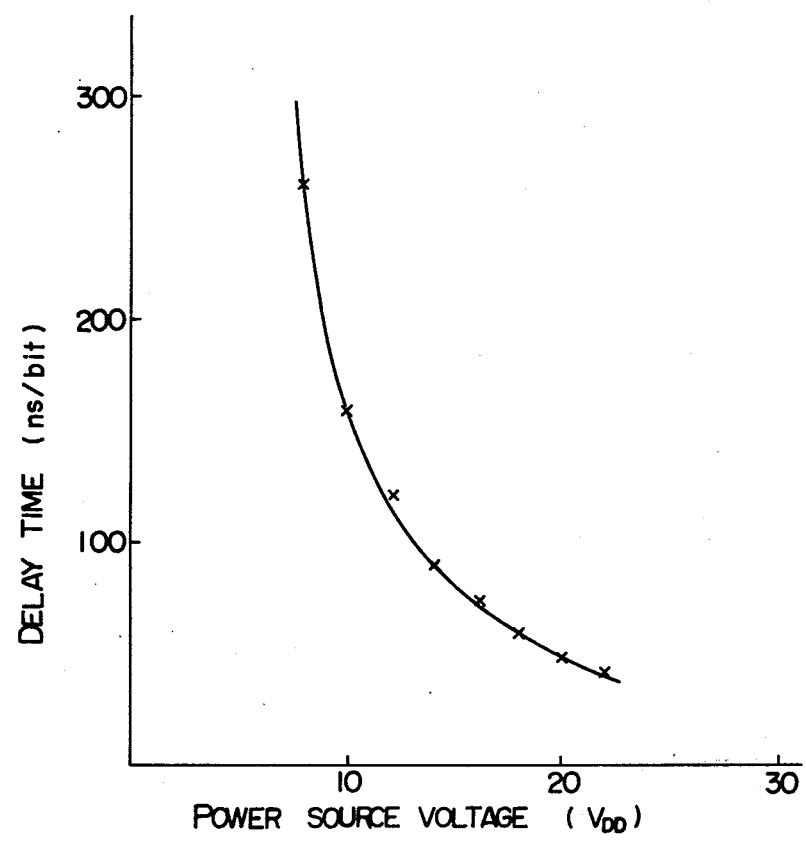
FIG. 6 is a graphic representation of the characteristic of the scanning circuit shown in FIG. 4.

FIG. 6 shows the characteristic of such a scanning circuit as having the structure shown in FIG. 4, i.e. the result of measurement of delay time $t_{pd}$ when the conductance $g_m$ of the load MOSFET is varied, that is, the voltage of the power source is changed. Near the lower limit of the voltage to operate the scanning circuit (below −8V), the delay time $t_{pd}$ increases rapidly but it decreases with the increase of the voltage. It is because the voltage-current characteristic of the MOSFET is of the second power that the relationship between the delay time $t_{pd}$ and the power source voltage $V_{DD}$ is represented by a quadratic curve.

Therefore, the delay time of ten to several hundred nanoseconds can be obtained easily by appropriately designing the output capacity and the conductance $g_m$ and if the time constant for reading the signal from each photoelectric conversion element is so designed as to be smaller than the delay time $t_{pd}$, video signals can be obtained at a scanning speed of several to 100 MHz bit which is determined by $t_{pd}$.

Thus, in comparison with the conventional scanning speed of 3–5MHz, the above attained scanning speed is greater by more than one order. The scanning circuit according to the present invention needs no clock signal and therefore not only external circuits such as clock generators which add to the complexity of the overall circuit can be eliminated but also the noise induced by the clock pulses and appearing on the signal output line to degrade the S/N ratio of the video signal does not exist. This means that the photo-sensitivity is effectively improved. That is a great advantage.

In the embodiment shown in FIG. 4, a single DC power source serves to drive the circuit and to control the delay time.

Figure 7:
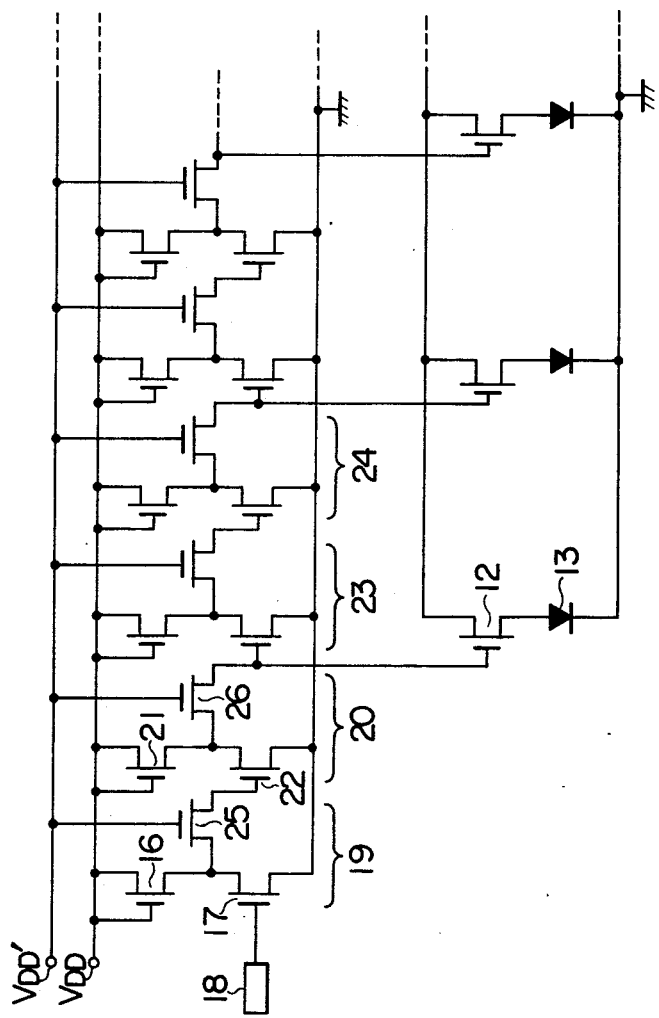
FIG. 7 shows the structure of a solid-state image pickup device using a scanning circuit as another embodiment of the present invention.

FIG. 7 shows a scanning circuit as another embodiment of the present invention. This circuit is different from that shown in FIG. 4 in that another DC power source and the associated MOSFET's for causing time delays are additionally provided to separate the driving of the circuit from the control of the delay time. In FIG. 7, the DC power source for controlling the delay time is indicated at $V_{DD'}$ and the MOSFET's for causing time delay, provided respectively at the output sides of the polarity inverting circuits 19 and 20, are designated by numerals 25 and 26. The source and the drain of the MOSFET 25 are connected respectively with the junction point of the source of the load MOSFET 16 and the drain of the driving MOSFET 17, of the polarity inverting circuit 19 and with the gate of the driving MOSFET 22 of the polarity inverting circuit 20. The source and the drain of the MOSFET 26 are connected respectively with the junction point of the source of the load MOSFET 21 and the drain of the driving MOSFET 22, of the polarity inverting circuit 20 and with the gate of the driving MOSFET of the next polarity inverting circuit 23. The gates of the MOSFET's 25 and 26 are connected with the DC power source $V_{DD'}$. Since the conductances $g_m$ of the MOSFET's 25 and 26 are varied depending upon the voltage of the DC power source $V_{DD'}$, the delay time $t_{pd}$ can be varied also in this case. In the embodiment shown in FIG. 7, each unit circuit consists of six MOSFET's, two of them being used to control time delay but it is also possible to constitute each unit circuit of five MOSFET's with only one of them used for the control of delay time. The operation of the circuit shown in FIG. 7 is the same as that of the circuit shown in FIG. 4 and a train of output pulses shifted time-sequentially from one another, as seen in FIG. 5 can be obtained from the respective stage of the scanning circuit.

In the above described embodiments are mentioned scanning circuits (for solid-state image pickup devices) in which the photoelectric conversion elements are time-sequentially selected.

FIG. 8 shows a scanning circuit according to the present invention, as applied to a memory circuit in which capacitive elements are successively selected. In FIG. 8 are shown capacitive elements 27 which are MOSFET capacitances or PN junction diode capacitances and a common input/output line 28 connected commonly with the drains of the switching MOSFET's 12. If analog or digital information is fed to the line 28, it is written in the respective capacitive elements through the selection of the switching MOSFET's 12. After being stored for a required time, the information can be read out by operating the scanning circuit again. With the scanning circuit according to the present invention the writing and reading of information can be performed at a high speed of several tens of MHz.

As described in detail above, according to the present invention, several great advantages can be enjoyed: a high speed scanning circuit can be realized, no external circuit for generating clock pulses is needed and a high S/N ratio can be obtained. The present invention is therefore very useful for the improvement of the characteristic and for the expansion of the application field, of the solid-state image pickup device.

In each of the above embodiments, the scanning circuit is constituted of a multiplicity of cascade-connected unit circuits, each consisting of a pair of polarity inverting circuits or a pair of polarity inverting circuits and a pair of MOSFET's for causing time delays. However, it is needless to say that numerous variations are possible without departing from the scope and spirit of the present invention. Moreover, since the conductances $g_m$ of the load MOSFET and the delaying MOSFET are varied by changing the voltages of the DC power sources $V_{DD}$ and $V_{DD'}$, the delay time $t_{pd}$ can be varied within a certain range (see FIG. 6) without changing the circuit configuration. Further, it is also possible to use phototransistors or avalanche diodes as photoelectric conversion elements. Furthermore, the MOSFET's used exclusively in the previous embodiments can be replaced by junction type field effect transistors or bipolar transistors. In conclusion, it should be noted that the principle described above concerning the linear scanning circuit can also be applied to the fabrication of a scanning circuit for a two-dimensional image pickup device.

We claim:

1. A scanning circuit comprising:
a circuit means consisting of a plurality of cascade-connected circuits, each unit circuit having a first and a second polarity inverting circuit and the output of said first polarity inverting circuit being fed as an input to said second polarity inverting circuit;
a first power source means to supply DC power for each of said unit circuits;
an input means to apply an input signal to the first stage of said circuit means; and
an output means to take out the output of said second polarity inverting circuit of each of said unit circuits, wherein said first polarity inverting circuit includes a first and a second MOS transistor, each transistor having an input terminal and first and second output terminals, and said second polarity inverting circuit includes a third and a fourth MOS transistor, each transistor having an input terminal and first and second output terminals, said input terminal and said first output terminal of each of said first and third transistors being commonly connected with one terminal of said first power source means, said second output terminals of said first and third transistors being connected with said first output terminals of said second and fourth transistors, respectively, said second output terminals of said second and fourth transistors being connected with the other terminal of said first power source means, said first output terminal of said second transistor being connected with said input terminal of said fourth transistor, said first output terminal of said fourth transistor being connected with said output means; further comprising a second power source means and a fifth MOS transistor provided in each unit circuit of said circuit means, said fifth transistor having an input terminal and a first and a second output terminal, said input terminal of said fifth transistor being connected with said second power source means, and said first and second output terminals of said fifth transistor being connected respectively with said first output terminal of said second transistor and said input terminal of said fourth transistor.

2. A scanning circuit comprising:
a circuit means consisting of a plurality of cascade-connected circuits, each unit circuit having a first and a second polarity inverting circuit and the output of said first polarity inverting circuit being fed as an input to said second polarity inverting circuit;
a first power source means to supply DC power for each of said unit circuits;
an input means to apply an input signal to the first stage of said circuit means; and
an output means to take out the output of said second polarity inverting circuit of each of said unit circuits, wherein said first polarity inverting circuit includes a first and a second MOS transistor, each transistor having an input terminal and first and second output terminals, and said second polarity inverting circuit includes a third and a fourth MOS transistor, each transistor having an input terminal and first and second output terminals, said input terminal and said first output terminal of each of said first and third transistors being commonly connected with one terminal of said first power source means, said second output terminals of said first and third transistors being connected with said first output terminals of said second and fourth transistors, respectively, said second output terminals of said second and fourth transistors being connected with the other terminal of said first power source means, said first output terminal of said second transistor being connected with said input terminal of said fourth transistor, said first output terminal of said fourth transistor being connected with said output means, further comprising a second power source means and a fifth MOS transistor provided in each unit circuit of said circuit means, said fifth transistor having an input terminal and a first and a second output terminal, said input terminal of said fifth transistor being connected with said second power source means, and said first and second output terminals of said fifth transistor being connected respectively with said first output terminal of said second transistor and said input terminal of said fourth transistor; further comprising in each unit circuit of said circuit means a sixth MOS transistor having an input terminal and a first and a second output terminal, said input terminal of said sixth transistor being connected with said second power source means and said first and second output terminals of said sixth transistor being connected respectively with said first output terminal of said fourth transistor and said output means.

3. A scanning circuit comprising:
a circuit means consisting of a plurality of cascade-connected unit circuits, each unit circuit having a first and a second polarity inverting circuits and the output of said first polarity inverting circuit being fed as an input to said second polarity inverting circuit;
a first and a second power source means to supply DC power for each of said unit circuits;
an input means to apply an input signal to the first stage of said circuit means; and
an output means to take out the output of said second polarity inverting circuit of each of said unit circuits;
wherein said first polarity inverting circuit consists of a first and a second transistor and said second polarity inverting circuit consists of a third and a fourth transistors, each said first, second, third and fourth transistors having an input terminal and first and second output terminals and said first output terminal of each of said first and third transistors being commonly connected with one end of said first power source means, said second output terminals of said first and third transistors being connected respectively with said first output terminals of said second and fourth transistors, said second output terminals of said second and fourth transistors being connected with the other end of said first power source means; each unit circuit further including a fifth transistor having an input terminal connected with said second power source means, a first output terminal connected with one of said first output terminals of said second and fourth transistors and a second output terminal connected with one of said input terminals of said fourth transistor and said output means.

4. A scanning circuit as claimed in claim 3, wherein said first and second output terminals of said fifth transistor are connected with said first output terminal of said fourth transistor and said output means, respectively.

5. A scanning circuit comprising:
a circuit means consisting of a plurality of cascade-connected circuits, each unit circuit having a first and a second polarity inverting circuit and the output of said first polarity inverting circuit being fed as an input to said second polarity inverting circuit;
a first power source means to supply DC power for each of said unit circuits;
an input means to apply an input signal to the first stage of said circuit means; and
an output means to take out the output of said second polarity inverting circuit of each of said unit circuits, wherein said first polarity inverting circuit includes a first and a second MOS transistor, each transistor having an input terminal and first and second output terminals, and said second polarity inverting circuit includes a third and a fourth MOS transistor, each transistor having an input terminal and first and second output terminals, said input terminal and said first output terminal of each of said first and third transistors being commonly connected with one terminal of said first power source means, said second output terminals of said first and third transistors being connected with said first output terminals of said second and fourth transistors, respectively, said second output terminals of said second and fourth transistors being connected with the other terminals of said first power source means, said first output terminal of said second transistor being connected with said input terminal of said fourth transistor, said first output terminal of said fourth transistor being connected with said output means; further comprising a second power source means and a fifth MOS transistor provided in each unit circuit of said circuit means, said fifth transistor having an input terminal and a first and a second output terminals, said input terminal of said fifth transistor being connected with said second power source means, and said first and second output terminals of said fifth transistor being connected respectively with said first output terminal of said second transistor and said input terminal of said fourth transistor; further comprising in each unit circuit of said circuit means a sixth MOS transistor having an input terminal and a first and a second output terminals, said input terminal of said sixth transistor being connected with said second power source means and said first and second output terminals of said sixth transistor being connected respectively with said first output terminal of said fourth transistor and said output means; wherein said second power source comprises a DC power source.

* * * * *